(12) United States Patent
Naito (10) Patent No.: US 9,377,069 B2
(45) Date of Patent: Jun. 28, 2016

(54) VEHICLE DISC BRAKE

(71) Applicant: NISSIN KOGYO CO., LTD., Ueda, Nagano (JP)

(72) Inventor: Tetsuya Naito, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 0 days.

(21) Appl. No.: 14/476,239

(22) Filed: Sep. 3, 2014

(65) Prior Publication Data

US 2015/0068853 A1 Mar. 12, 2015

(30) Foreign Application Priority Data

Sep. 6, 2013 (JP) .................................. 2013-185236

(51) Int. Cl.
*F16D 55/18* (2006.01)
*F16D 65/097* (2006.01)
*F16D 55/228* (2006.01)
*F16D 65/092* (2006.01)
(Continued)

(52) U.S. Cl.
CPC .......... *F16D 65/0971* (2013.01); *F16D 55/225* (2013.01); *F16D 55/228* (2013.01); *F16D 65/092* (2013.01); *F16D 65/0979* (2013.01); *F16D 2055/0091* (2013.01)

(58) Field of Classification Search
CPC . F16D 55/225; F16D 65/0971; F16D 55/228; F16D 65/092; F16D 65/0979; F16D 2055/0091
USPC ............................................... 188/72.4, 72.5
See application file for complete search history.

(56) References Cited

U.S. PATENT DOCUMENTS 3,612,226 A * 10/1971 Pauwels .............. F16D 55/2262
188/205 A
4,186,824 A * 2/1980 Preston et al. ............. 188/73.38
4,609,077 A * 9/1986 Nakatsuhara ......... F16D 55/227
188/250 E (Continued)

FOREIGN PATENT DOCUMENTS

DE 4110869 A1 * 10/1992
DE 4324988 A1 2/1995
(Continued)

OTHER PUBLICATIONS

Machine translation in English for DE 4110869A1, Inventor: Weiler et al; 3 pages; Retrieve Date: Aug. 5, 2015.*

(Continued)

*Primary Examiner* — Thomas J Williams
*Assistant Examiner* — Mariano Sy
(74) *Attorney, Agent, or Firm* — Andrew M. Calderon; Roberts Mlotkowski Safran & Cole, P.C.

(57) ABSTRACT

A vehicle disc brake includes a caliper body, pistons and a pair of friction pads. The caliper body has a pair of operation arms and a bridge portion. Each operation arm has a cylinder bore and a pair of pad guide grooves. The pistons are each inserted into the corresponding cylinder bore. Each friction pad has a lining and a back plate. Each friction pad further includes a pair of lug pieces and a projection. The lug pieces are accommodated in the pad guide grooves so that the friction pads are movable in an axial direction of a disc rotor. The projection is provided so as to be positioned inside an opening portion of the piston with a gap from an inner circumferential surface thereof.

19 Claims, 5 Drawing Sheets

(51) Int. Cl.
*F16D 55/225* (2006.01)
*F16D 55/00* (2006.01)

(56) References Cited

U.S. PATENT DOCUMENTS

| | | | | |
|---|---|---|---|---|
| 4,809,825 | A * | 3/1989 | Oltmanns et al. | 188/73.31 |
| 4,905,796 | A * | 3/1990 | Schonenberger et al. | 188/73.39 |
| 5,113,978 | A * | 5/1992 | Weiler et al. | 188/73.31 |
| 5,509,508 | A * | 4/1996 | Evans | 188/73.38 |
| 5,615,754 | A * | 4/1997 | Kobayashi | F16D 55/227 188/370 |
| 5,704,452 | A * | 1/1998 | Maligne | 188/73.38 |
| 5,706,917 | A * | 1/1998 | Matsuzaki | 188/73.38 |
| 6,116,384 | A * | 9/2000 | Matsumoto et al. | 188/73.31 |
| 6,170,618 | B1 * | 1/2001 | Rueckert | 188/73.37 |
| 7,503,437 | B2 * | 3/2009 | Toyoda | F16D 55/228 188/71.1 |
| 8,348,025 | B2 * | 1/2013 | Arbesman et al. | 188/73.36 |
| 8,517,152 | B2 * | 8/2013 | Zenzen et al. | 188/73.38 |
| 2002/0096404 | A1 * | 7/2002 | Storzel et al. | 188/73.38 |
| 2009/0236187 | A1 | 9/2009 | Bach et al. | |

FOREIGN PATENT DOCUMENTS

| | | |
|---|---|---|
| EP | 1832777 A1 | 1/2007 |
| JP | S60091033 | 5/1985 |
| JP | S60184728 | 9/1985 |
| JP | H08159184 | 6/1996 |
| JP | 2008275011 | 11/2008 |
| JP | 5226664 | 3/2013 |
| WO | WO-9217713 A1 | 10/1992 |

OTHER PUBLICATIONS

Japanese Office Action for related JP Application No. 2013-185236 dated Jun. 2, 2015, 6 pages.
Search Report for related EP application No. 14183712.0-1756 dated Jan. 20, 2015, 6 pages.

* cited by examiner

VEHICLE DISC BRAKE

CROSS-REFERENCE TO RELATED APPLICATION(S)

This application claims priority from Japanese Patent Application No. 2013-185236 filed on Sep. 6, 2013, the entire contents of which are incorporated herein by reference.

FIELD

An embodiment described herein generally relates to a disc brake that is used for a vehicle such as a motor vehicle or a motorcycle and more particularly to a vehicle disc brake with an opposed-piston fixed caliper that includes a pair of operation arms each having a cylinder bore that opens towards a side of a disc rotor.

BACKGROUND

There is an opposed-piston-type vehicle disc brake in which friction pads are disposed on a pair of operation arms of a caliper body so as to face both sides of the disc rotor while being suspended by hanger pins that bridge the pair of operation arms of the caliper body, whereby the friction pads are prevented from falling.

On the other hand, the hanger pins may be omitted to reduce production cost. In this case, a pair of pad guide grooves are formed in the caliper body, and a pair of lug pieces formed at a turning disc rotor entrance side and exit side of a back plate of the friction pad are accommodated individually in the pad guide grooves, thereby supporting the friction pad in the caliper body so as to be movable in an axial direction of the disc rotor (refer to JP-5226664-A, for example).

However, in such hanger-pin-omitted opposed-piston-type vehicle disc brake as described in JP-5226664-A, in the state where the brakes are applied with a lining of the friction pad fully worn down to the back plate, when the back plate is caused to approach the disc rotor as near as a preset distance or more, the lug pieces drop in gaps between the pad guide grooves and the disc rotor, the friction pad could possibly fall off the caliper body.

SUMMARY

One object of the invention is to provide an opposed-piston-type vehicle disc brake that can prevent a friction pad from falling even in the state where a lining of the friction pad wears fully down to a back plate.

The present invention provides following Aspects 1 to 5.
1. A vehicle disc brake including:
   a caliper body having a pair of operation arms disposed to face both sides of a disc rotor and a bridge portion disposed to connect the operation arms and to straddle an outer circumference of the disc rotor, each operation arm having a cylinder bore that opens towards the side of the disc rotor and a pair of pad guide grooves;
   pistons each formed with an opening portion and inserted into the corresponding cylinder bore such that the opening portion thereof is oriented towards the side of the disc rotor;
   a pair of friction pads disposed on the both sides of the disc rotor, each friction pad having
      a lining;
      a back plate that supports the lining;
      a pair of lug pieces that are provided at a turning disc rotor entrance side and a turning disc rotor exit side of the back plate, which are defined with reference to a vehicle forward traveling state, and that are accommodated in the pad guide grooves so that the friction pads are movable in an axial direction of the disc rotor, and
      a projection that projects from the back plate towards a bottom portion of the cylinder bore so as to be positioned inside the opening portion of the piston with a gap from an inner circumferential surface of the piston.
2. The vehicle disc brake of Aspect 1,
   wherein the cylinder bore are provided in plurality in each operating arm of the caliper body, and the pistons individually accommodated in the cylinder bores, and
   wherein at least two of the projection are provided on the back plate for a turning disc rotor entrance side piston which is disposed nearest to the turning disc rotor entrance side among the pistons and a turning disc rotor exit side piston which is disposed nearest to the turning disc rotor exit side among the pistons.
3. The vehicle disc brake of Aspect 2,
   wherein the projection for the turning disc rotor entrance side piston lies nearest to a turning disc rotor entrance side end face of the back plate, and the projection for the turning disc rotor exit side piston lies nearest to a turning disc rotor exit side end face of the back plate.
4. The vehicle disc brake of Aspect 2,
   wherein other projections are provided more radially inwards of the disc rotor than a horizontal line passing through center axes of the pistons.
5. The vehicle disc brake of Aspect 2,
   wherein there are provided
   the projection that is provided for the turning disc rotor entrance side piston and that lies nearest to a turning disc rotor entrance side end face of the back plate,
   the projection that is provided for the turning disc rotor entrance side piston and that lies more radially inwards of the disc rotor than a center axis of the turning disc rotor entrance side piston,
   the projection that is provided for the turning disc rotor exit side piston and that lies nearest to a turning disc rotor exit side end face of the back plate, and
   the projection that is provided for the turning disc rotor exit side piston and that lies more radially inwards of the disc rotor than a center axis of the turning disc rotor exit side piston.

In general, when the brakes are applied in the state where the lining of the friction pad is fully worn down to the back plate of the friction pad, since the back plate to approach the disc rotor as near as a preset distance or more, the lug pieces could possibly drop in gaps between the pad guide grooves and the disc rotor. However, according to the vehicle disc brake of the invention, the projections that are formed on the back plate of the friction pad are brought into abutment with the inner circumferential surfaces of the pistons, whereby the friction pad can be prevented from falling off the caliper body. In the case of cup-shaped piston with its opening portion oriented towards a side of a friction pad which is widely used, the friction pad can be prevented from falling with a simple construction. Since the gaps are formed between the inner circumferential surfaces of the pistons and the projections, the projections do not impair the sliding capability of the pistons.

Even with a opposed-multi-pot-type disc brake that includes plural cylinder bores in each of a pair of operation arms, by providing at least one projection for each of the turning disc rotor entrance side piston that is disposed nearest to the turning disc rotor entrance side of the back plate and the turning disc rotor exit side piston that is disposed nearest to the turning disc rotor exit side that results when the vehicle is traveling forwards, the friction pad can be surely prevented from falling, and the looseness or rattling of the friction pad in a disc rotor turning direction can be restricted to a minimum level.

By providing the projection in the position on the back plate that lies nearest to the turning disc rotor entrance side end face of the back plate for the turning disc rotor entrance side piston and the projection in the position on the back plate that lies nearest to the tuning disc rotor exit side end of the back plate for the turning disc rotor exit side piston, even with a friction pad that is long in dimension in the disc rotor turning direction installed in a disc brake having many pistons installed therein, the friction pad can be surely prevented from falling.

By providing the projection for each of the pistons so as to be disposed more radially inwards of the disc rotor than the horizontal line passing through the center axes of the pistons, the friction pad can be effectively prevented from the falling in, for example, a vehicle disc brake in which a caliper body is disposed at an upper portion of a disc rotor.

By providing the projection that is provided for the turning disc rotor entrance side piston and that lies nearest to the turning disc rotor entrance side end face of the back plate, the projection that is provided for the turning disc rotor entrance side piston and that lies more radially inwards of the disc rotor than a center axis of the turning disc rotor entrance side piston, the projection that is provided for the turning disc rotor exit side piston and that lies nearest to the turning disc rotor exit side end face of the back plate, and the projection that is provided for the turning disc rotor exit side piston and that lies more radially inwards of the disc rotor than a center axis of the turning disc rotor exit side piston, the friction pad can be surely prevented from falling.

DETAILED DESCRIPTION

Figure 1:
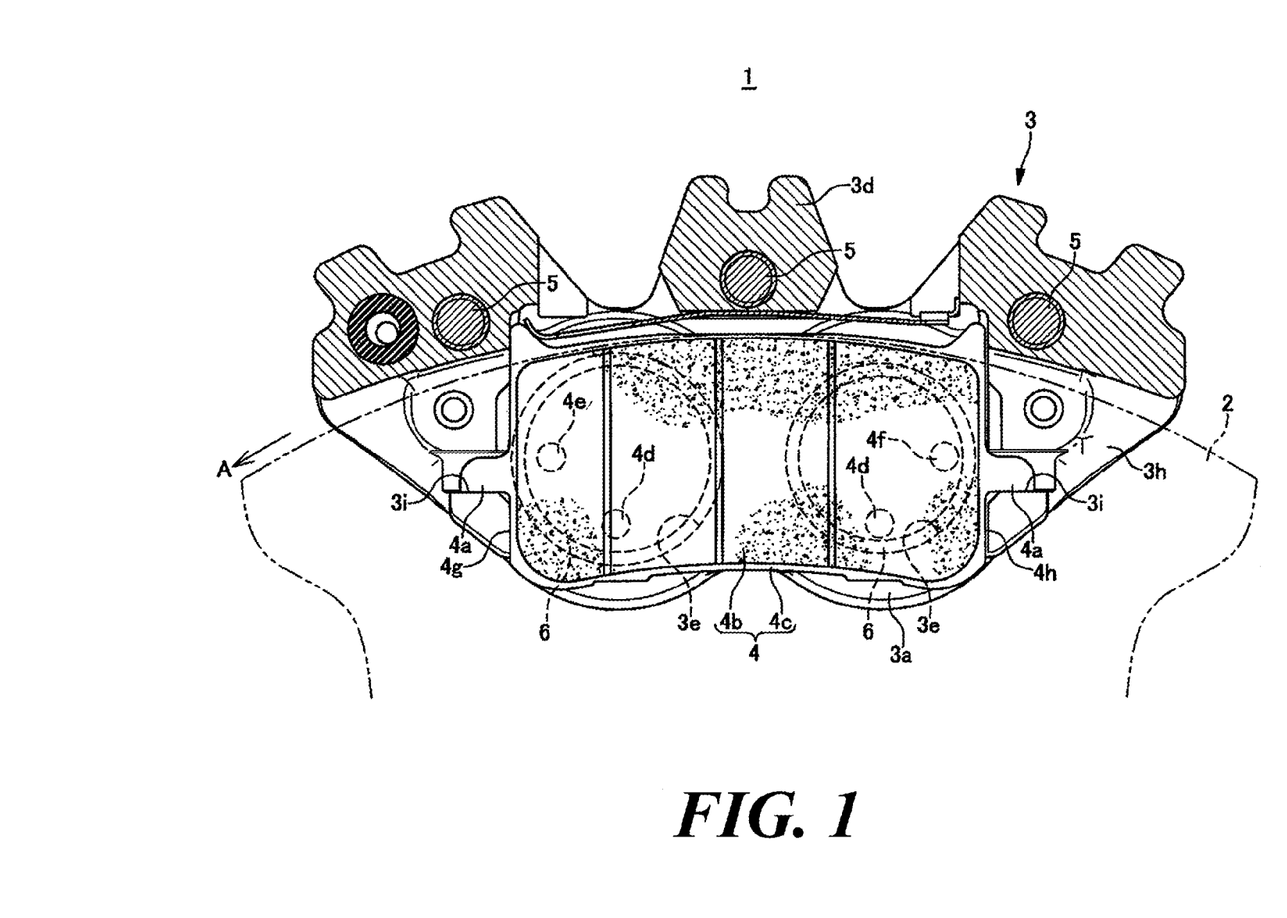
FIG. 1 is a sectional view taken along the line I-I in FIG. 6.
Figure 2:
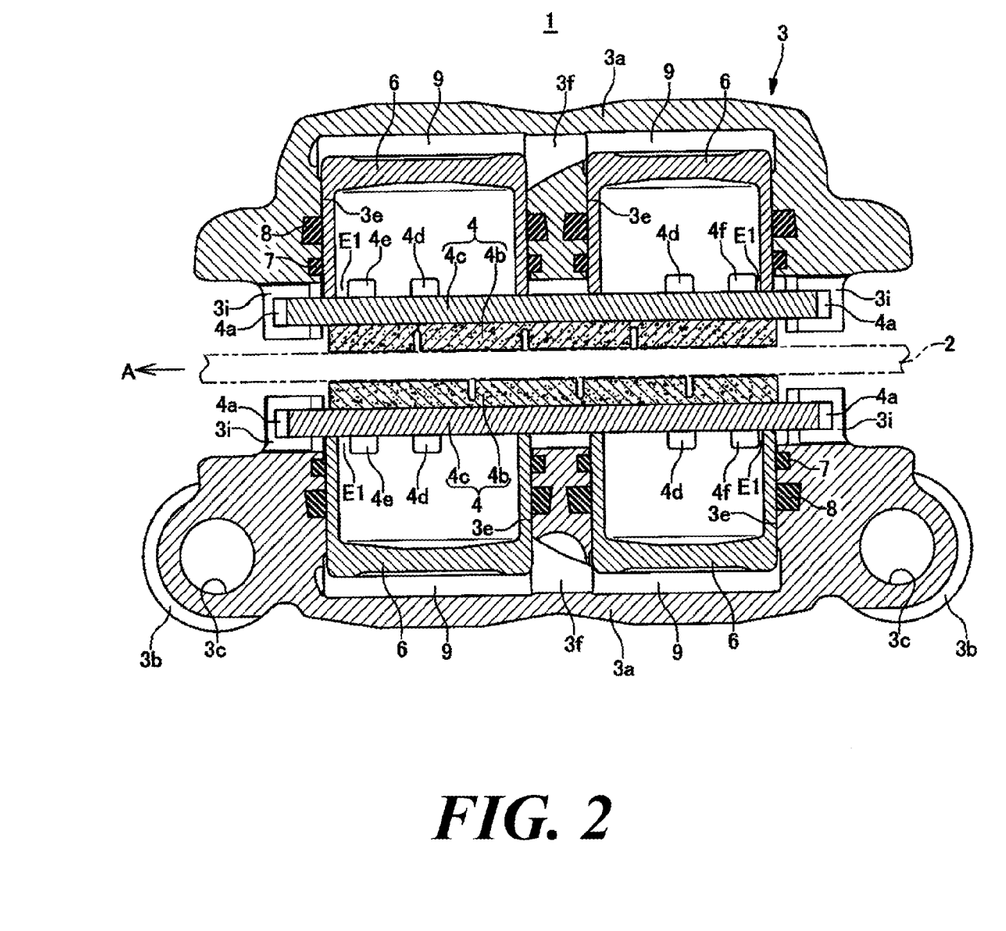
FIG. 2 is a sectional view taken along the line II-II in FIG. 5.
Figure 3:
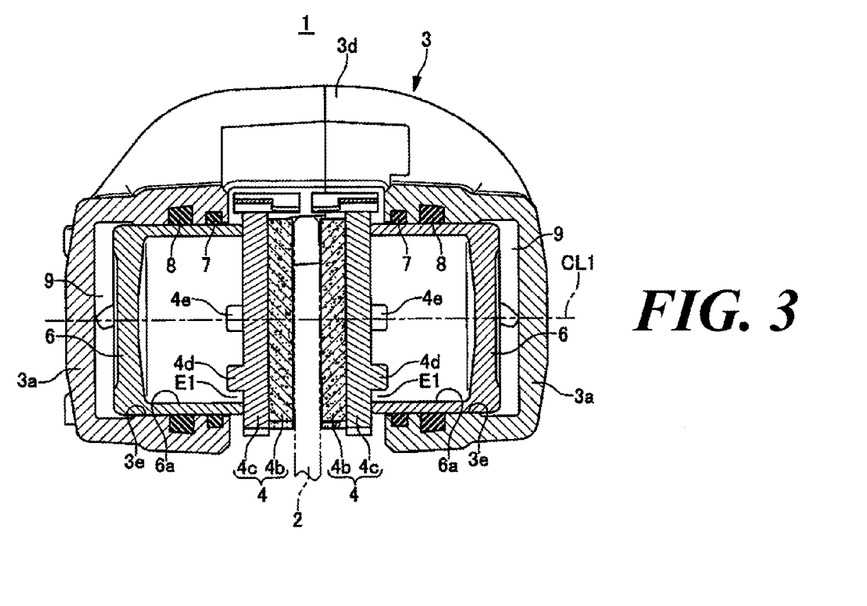
FIG. 3 is a sectional view taken along the line in FIG. 5.
Figure 4:
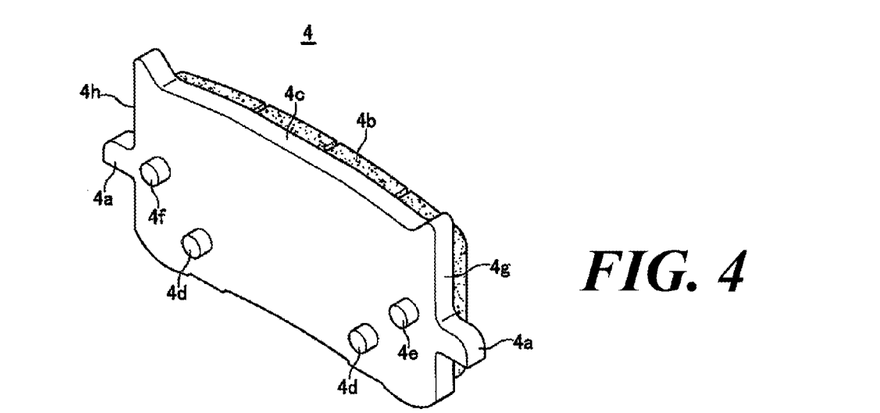
FIG. 4 is a perspective view of a friction pad showing an embodiment.
Figure 5:
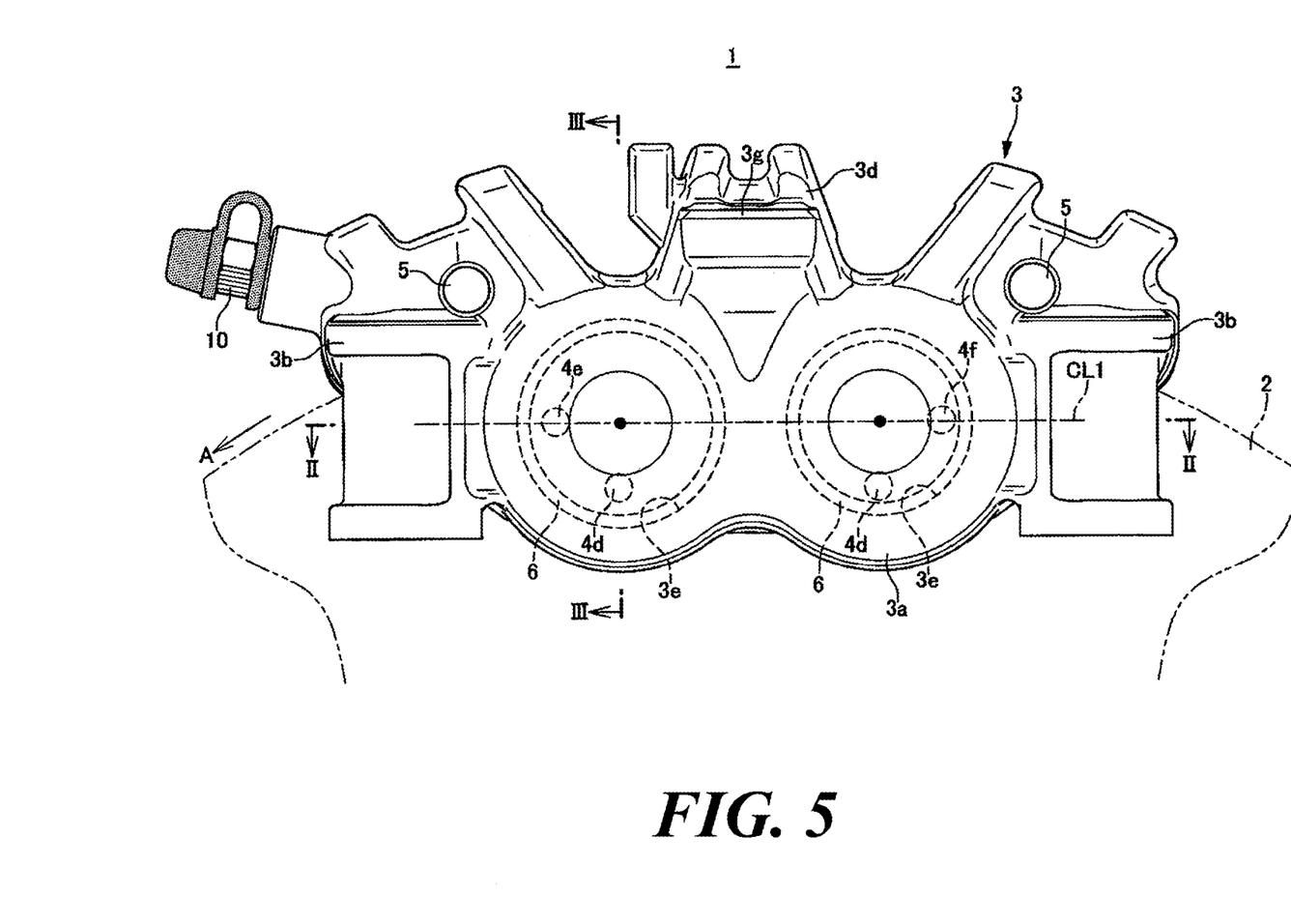
FIG. 5 is a front view of a vehicle disc brake according to the embodiment.
Figure 6:
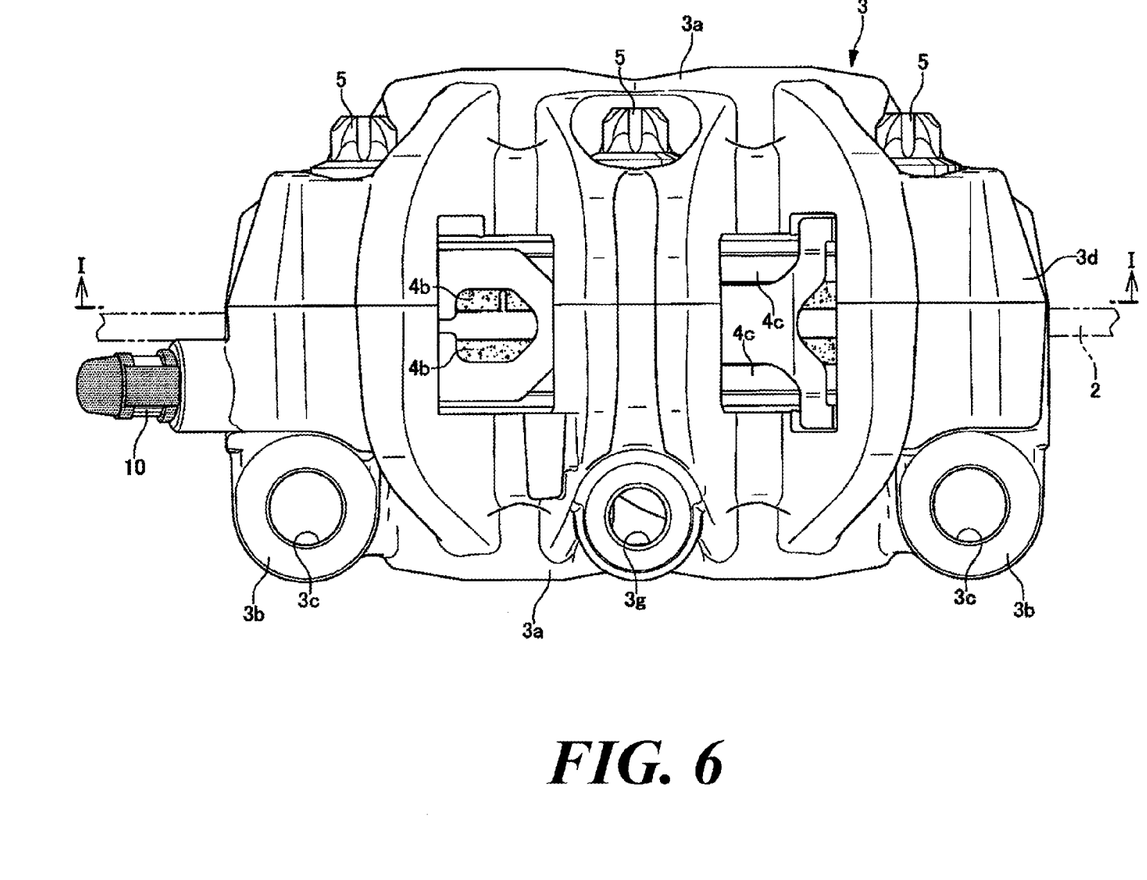
FIG. 6 is a plan view of the vehicle disc brake according to the embodiment.

FIGS. 1 to 6 are views showing a vehicle disc brake according to an embodiment. An arrow A denotes a turning direction of a disc rotor that turns together with a wheel when a vehicle travels forwards and that when referred to in the following description, a turning disc rotor entrance side and a turning disc rotor exit side are those that result when the vehicle travels forwards.

A vehicle disc brake 1 of this embodiment includes the disc rotor 2 that turns together with the wheel, a caliper body 3 that is mounted on a vehicle body at one side portion of the disc rotor 2, and friction pads 4, 4 that are disposed between operation arms 3a, 3a of the caliper body 3 that are provided at both side portions of the disc rotor 2 so as to be opposite to each other across the disc rotor 2. Mounting boss portions 3b, 3b, which extend in a radial direction of the disc rotor 2, are formed individually at both side portions of the outboard operation arm 3a in relation to a circumferential direction of the disc rotor 2. A mounting bolt insertion hole 3c is formed in each mounting boss portion 3b so as to open in the radial direction of the disc rotor 2. Then, mounting bolts (not shown) are inserted through the corresponding mounting bolt insertion holes 3c so as to be screwed into caliper mounting portions on the vehicle body, whereby the caliper body 3 is mounted on the vehicle body. In this embodiment, the caliper body 3 is mounted above the disc rotor 2.

The caliper body 3 having opposed four pots/pistons is formed by bringing the pair of operation arms 3a, 3a into abutment with each other at their bridge portions 3d which then straddle an outer circumference of the disc rotor 2 and connecting together the pair of operation arms 3a, 3a with three connecting bolts 5. Two cylinder bores 3e are formed in each of the pair of operation arms 3a, 3a so as to be opposite to each other. A piston 6, which is formed into a cup-like shape, is inserted movably in each cylinder bore 3e with its opening portion oriented towards the side of the disc rotor 2. A dust seal 7 is mounted in an inner circumferential portion of each cylinder bore 3e at an open side thereof, and a piston seal 8 is mounted in the inner circumferential portion of the cylinder bore 3e at a bottom portion side thereof that lies further inwards into the cylinder bore 3e than the dust seal 7. Thus, a hydraulic chamber 9 is defined in each cylinder bore 3e between the piston 6 and a bottom portion of the cylinder bore 3e. The hydraulic chambers 9 that are formed adjacent to each other in each operation arm 3a are caused to communicate with each other by a communication hole 3f. A union hole 3g and a bleeder hole (not shown) are provided in the operation arm 3a that is mounted on the vehicle body, and a bleeder screw 10 is screwed securely into the bleeder hole. Pad guide holes 3i, 3i are formed in a disc-rotor-facing surface 3h of each operation arm 3a in positions that lie radially inwards of the disc rotor 2, and a pair of lug pieces 4a, 4a of the friction pad 4 are supported individually therein.

The friction pads 4, 4 are disposed individually between the operation arms 3a, 3a and the disc rotor 2 and each include a lining 4b that is adapted to be brought into sliding contact with the disc rotor 2 and a metallic back plate 4c to which the lining 4b is affixed. The pair of lug pieces 4a, 4a are provided individually at a turning disc rotor entrance side and a turning disc rotor exit side of the back plate 4c so as to project therefrom. By accommodating the lug pieces 4a, 4a individually in the pad guide grooves 3i, 3i that are firmed in the caliper body 3, the friction pads 4, 4 are supported so as to move in the axial direction of the disc rotor 2. According to this construction, hanger pins to hold the friction pads in a suspended fashion can be omitted.

On a back surface of the back plate 4c to which the lining 4b is not affixed and which faces the opening portions of the pistons 6, 6, lower projections 4d, 4d, a turning disc rotor entrance side projection 4e and a turning disc rotor exit side projection 4f are provided. The lower projections 4d, 4d, the turning disc rotor entrance side projection 4e and the turning disc rotor exit side projection 4f ("projections") project towards the bottom portions of the cylinder bores 3e, such that a gap E1 is respectively defined with respect to inner circumferential surfaces 6a, 6a of the pistons 6, 6. The lower projections 4d, 4d are formed on the back surface of the back plate 4c so as to be positioned inside the pistons 6, 6 and that correspond to lower end portions of the pistons 6, 6. The turning disc rotor exit side projection 4e is formed on the back surface of the back plate 4c in the position that lies inside the piston ("turning disc rotor exit side piston") 6 that is disposed at a turning disc rotor exit side and that lies nearest to a turning disc rotor exit side end face 4g (an end face in a disc rotor turning direction) of the back plate 4c. The turning disc rotor entrance side projection 4f is formed on the back surface of the back plate 4c in the position that lies inside the piston ("turning disc rotor entrance side piston") 6 that is disposed at a turning disc rotor entrance side and that lies nearest to a turning disc rotor entrance side end face 4h (an end face in the disc rotor turning direction) of the back plate 4c. The lower projections 4d, 4d are disposed downward of a horizontal line CL1 that passes through center axes of the pistons 6, 6.

When the brakes are applied such that the friction pad 4 is pressed towards the disc rotor 2 in the state where the lining 4b of the friction pad 4 is worn fully down to the back plate 4c, since the back plate 4c approaches the disc rotor 2 as near as a preset distance or more, the lug pieces 4a, 4a could possibly fall in gaps between the pad guide grooves 3i and the disc rotor 2. However, since the vehicle disc brake 1 of this embodiment is formed in the way described above, any one of the lower projections 4d, 4d, the turning disc rotor exit side projection 4e and the turning disc rotor entrance side projection 4f is brought into abutment with the inner circumferential surface 6a of the piston 6, whereby the friction pad 4 can be prevented from falling from the caliper body 3. Since the gap E1 is formed between the inner circumferential surface 6a of the piston 6 and the individual projections 4d, 4e, 4f, the individual projections 4d, 4e, 4f do not impair the sliding capability of the piston 6 when the brakes are applied and released. Since the turning disc rotor exit side projection 4e is formed in the position that lies nearest to the turning disc rotor exit side end face 4g of the back plate 4c and the turning disc rotor entrance side projection 4f is formed in the position that lies nearest to the turning disc rotor entrance side end portion 4h of the back plate 4c, the looseness or rattling of the friction pad in the disc rotor turning direction can be restricted to a minimum level.

The embodiment can be applied not only to the vehicle disc brake having opposed four pots/pistons, but also to a vehicle disc brake having opposed two pots/pistons or opposed six or more of pots/pistons. The above-mentioned advantages can be accomplished by providing at least one projection for each piston, and hence, projections may be provided as required according to the number of pistons and the size thereof. The caliper body may be provided in any position relative to the disc rotor, and the projection should be provided in an optimum position according to the mounting position of the caliper body. The embodiment can be applied not only to the exemplified radial-mount-type caliper body, but also to a caliper body having an arbitrary mounting construction to the vehicle body.

The invention claimed is:

1. A vehicle disc brake including:
   a caliper body having a pair of operation arms disposed to face both sides of a disc rotor and a bridge portion disposed to connect the operation arms and to straddle an outer circumference of the disc rotor, each operation arm having a cylinder bore that opens towards the side of the disc rotor and a pair of pad guide grooves;
   pistons each formed with an opening portion and inserted into the corresponding cylinder bore such that the opening portion thereof is oriented towards the side of the disc rotor;
   a pair of friction pads disposed on the both sides of the disc rotor, each friction pad having
      a lining;
      a back plate that supports the lining;
      a pair of lug pieces that are provided at a turning disc rotor entrance side and a turning disc rotor exit side of the back plate, which are defined with reference to a vehicle forward traveling state, and that are accommodated in the pad guide grooves so that the friction pads are movable in an axial direction of the disc rotor, and
      a projection that projects from the back plate towards a bottom portion of the cylinder bore so as to be positioned inside the opening portion of the piston with a gap from an inner circumferential surface of the piston.

2. The vehicle disc brake of claim 1,
   wherein the cylinder bore are provided in plurality in each operation arm of the caliper body, and the pistons individually accommodated in the cylinder bores, and
   wherein at least two of the projection are provided on the back plate for a turning disc rotor entrance side piston which is disposed nearest to the turning disc rotor entrance side among the pistons and a turning disc rotor exit side piston which is disposed nearest to the turning disc rotor exit side among the pistons.

3. The vehicle disc brake of claim 2,
   wherein the projection for the turning disc rotor entrance side piston lies nearest to a turning disc rotor entrance side end face of the back plate, and the projection for the turning disc rotor exit side piston lies nearest to a turning disc rotor exit side end face of the back plate.

4. The vehicle disc brake of claim 2,
   wherein other projections are provided more radially inwards of the disc rotor than a horizontal line passing through center axes of the pistons.

5. The vehicle disc brake of claim 2,
   wherein there are provided
      the projection that is provided for the turning disc rotor entrance side piston and that lies nearest to a turning disc rotor entrance side end face of the back plate,
      the projection that is provided for the turning disc rotor entrance side piston and that lies more radially inwards of the disc rotor than a center axis of the turning disc rotor entrance side piston,
      the projection that is provided for the turning disc rotor exit side piston and that lies nearest to a turning disc rotor exit side end face of the back plate, and
      the projection that is provided for the turning disc rotor exit side piston and that lies more radially inwards of the disc rotor than a center axis of the turning disc rotor exit side piston.

6. The vehicle disc brake of claim 1, further comprising:
   mounting boss portions which extend in a radial direction of the disc rotor, and which are formed individually at both side portions an outboard operation arm of the operation arms in relation to a circumferential direction of the disc rotor; and
   a mounting bolt insertion hole formed in each mounting boss portion so as to open in the radial direction of the disc rotor.

7. The vehicle disc brake of claim 6, further comprising a dust seal mounted in an inner circumferential portion of each cylinder bore at an open side thereof, and a piston seal mounted in the inner circumferential portion of the cylinder bore at a bottom portion side thereof that lies further inwards into the cylinder bore than the dust seal, thereby forming a hydraulic chamber in each cylinder bore between the piston and a bottom portion of the cylinder bore.

8. The vehicle disc brake of claim 7, wherein the hydraulic chambers that are formed adjacent to each other in each operation arm communicate with each other by a communication hole.

9. The vehicle disc brake of claim 1, wherein the pad guide grooves are formed in a disc-rotor-facing surface of each operation arm in positions that lie radially inwards of the disc rotor, and the pair of lug pieces of the friction pad are supported individually therein.

10. The vehicle disc brake of claim 9, wherein the back plate is a metallic back plate to which the lining is affixed.

11. The vehicle disc brake of claim 9, wherein the projection comprises lower projections, a turning disc rotor entrance side projection and a turning disc rotor exit side projection.

12. The vehicle disc brake of claim 11, wherein the lower projections, the turning disc rotor entrance side projection and the turning disc rotor exit side projection are provided on a back surface of the back plate to which the lining is not affixed and which faces the opening portions of the pistons.

13. The vehicle disc brake of claim 12, wherein the lower projections, the turning disc rotor entrance side projection and the turning disc rotor exit side projection project towards bottom portions of the cylinder bores, such that the gap is respectively defined with respect to inner circumferential surfaces of the pistons.

14. The vehicle disc brake of claim 13, wherein the lower projections are formed on the back surface of the back plate so as to be positioned inside the pistons and that correspond to lower end portions of the pistons.

15. The vehicle disc brake of claim 14, wherein the turning disc rotor exit side projection is formed on the back surface of the back plate in a position that lies inside the piston that is disposed at a turning disc rotor exit side and that lies nearest to a turning disc rotor exit side end face of the back plate.

16. The vehicle disc brake of claim 15, wherein the turning disc rotor entrance side projection is formed on the back surface of the back plate in the position that lies inside the piston that is disposed at the turning disc rotor entrance side and that lies nearest to a turning disc rotor entrance side end face of the back plate.

17. The vehicle disc brake of claim 16, wherein the lower projections are disposed downward of a horizontal line CL1 that passes through center axes of the pistons.

18. The vehicle disc brake of claim 17, wherein any of the lower projections, the turning disc rotor exit side projection and the turning disc rotor entrance side projection is brought into abutment with the inner circumferential surface of the piston, such that the friction pad is prevented from falling from the caliper body.

19. The vehicle disc brake of claim 18, wherein the gap is formed between the inner circumferential surface of the piston and the individual projections, and the individual projections do not impair sliding capability of the piston when the brakes are applied and released.

* * * * *